United States Patent [19]

McGregor

[11] Patent Number: 4,646,972
[45] Date of Patent: Mar. 3, 1987

[54] SPRING MOUNTED SPRAY BOOM STRUCTURE

[75] Inventor: Steven R. McGregor, Nashua, Iowa

[73] Assignee: Cedar Valley Products, Inc., Charles City, Iowa

[21] Appl. No.: 663,303

[22] Filed: Oct. 22, 1984

[51] Int. Cl.⁴ ............................................. A01G 25/09
[52] U.S. Cl. ..................................... 239/168; 267/160
[58] Field of Search .............. 239/159, 163, 166, 167, 239/168, 169, 175, 176, 164, 172; 267/160

[56] References Cited

U.S. PATENT DOCUMENTS

| | | | |
|---|---|---|---|
| 3,395,503 | 8/1968 | Greenburg et al. | 239/164 X |
| 3,580,505 | 5/1971 | Loeffler | 239/168 |
| 3,902,667 | 9/1975 | Jackson | 239/167 |
| 3,927,832 | 12/1975 | Robison et al. | 239/168 |
| 4,197,999 | 4/1980 | Lammers | 239/166 |
| 4,213,565 | 7/1980 | Jackson | 239/167 X |
| 4,288,034 | 9/1981 | Widmer et al. | 239/168 |
| 4,344,572 | 8/1982 | Tyler | 239/168 |
| 4,372,492 | 2/1983 | Blumenshine | 239/168 |
| 4,441,655 | 4/1984 | Blumhardt | 239/163 |

FOREIGN PATENT DOCUMENTS

| | | | |
|---|---|---|---|
| 2256714 | 1/1979 | France | 239/168 |
| 617076 | 2/1949 | United Kingdom | 267/160 |
| 2028078 | 3/1980 | United Kingdom | 239/164 |
| 2088181 | 6/1982 | United Kingdom | 239/159 |

*Primary Examiner*—Andres Kashnikow
*Attorney, Agent, or Firm*—Kalish & Gilster

[57] ABSTRACT

A spray boom structure for mounting upon a vehicle which includes a support frame fixed upon the vehicle, a spray boom assembly having a midsection, flat spring means interengaging the frame and midsection for resilient support of the spray boom assembly. The springs are of general S-shaped configuration and shock absorbers disposed at an angle of approximately 40° to 50° to the vertical or mounted for disposition between the frame and midsection for coordinating with the springs for minimizing forceful, normally damaging impact upon the spray boom assembly through vehicle travel over irregular terrain.

11 Claims, 10 Drawing Figures

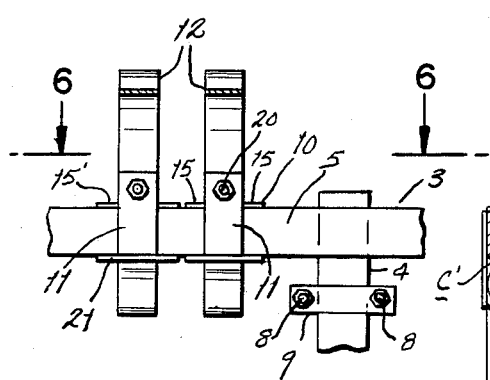
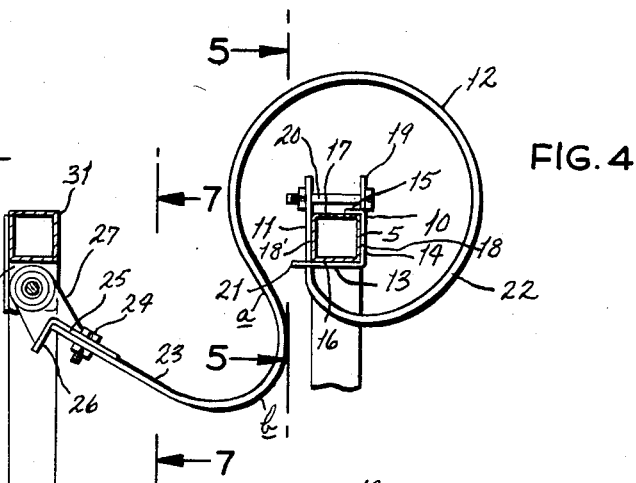
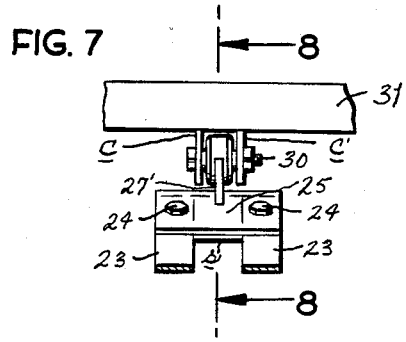
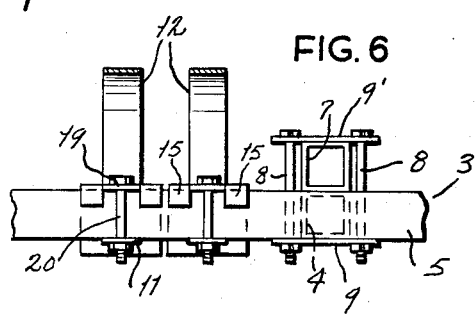
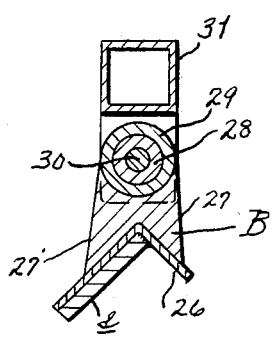
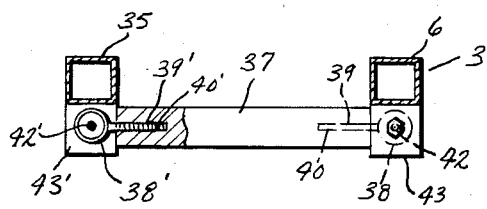
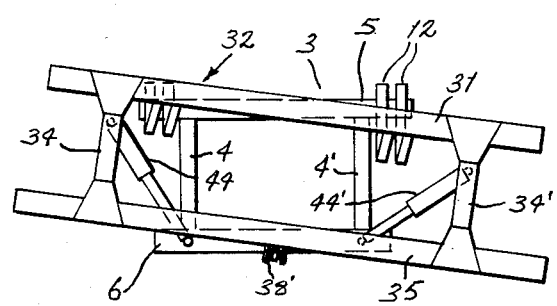

SPRING MOUNTED SPRAY BOOM STRUCTURE

BACKGROUND AND SUMMARY OF THE INVENTION

This invention relates in general to crop spraying apparatus and, more particularly, to spray boom assemblies adapted for unique floating suspension upon a vehicle for stabilizing the boom despite shock impact developed by vehicular travel over irregular ground. Heretofore, numerous efforts have been undertaken in an attempt to mitigate the shocks transmitted to a vehicular mounted agricultural spray boom as sustained by travel of the vehicle over rough terrain during dispensation of the particular treatment liquid. It has long been recognized that spray booms are subjected to considerable jolting and like forces during transport by the propelling vehicle as a result of the irregularity of the ground being traversed; with such resulting in both damage to the spray boom structures as well as conducing to uneven distribution of the treatment liquid. Manifestly, the jolting caused by ruts and the like in the terrain being traversed is directly proportional to the speed at which the vehicle is moving so that means for alleviating the effect of such shocks is necessary unless the vehicles are caused to travel at uneconomical, exceedingly low rates of speed.

Among such prior efforts has been the utilization of shock absorber springs and the like between the wing sections of the boom structures and the midsection with the latter being fixed to the vehicle. Structures of this type are exemplified by the patents to Jackson, U.S. Pat. Nos. 3,902,667 and 4,213,565. Also in this regard, attention may be directed to the Widmer et al U.S. Pat. No. 4,288,034. The Greenburg et al U.S. Pat. No. 3,395,503 reveals the attachment of the center or midsection of the boom assembly to the vehicle by a conventional heavy leaf spring built up from a number of flat springs of uniform rectangular cross section. The present invention provides a substantial improvement in the mounting of spray boom assemblies over the prior art.

Essentially, the present invention comprehends the suspension of a spray boom assembly from a fixed frame mounted upon the vehicle wherein the agents of suspension comprise generally S-shaped springs formed from flat strip stock. Such springs thus support the boom assembly in a floating manner; with the springs accepting the force of any impact transmitted thereto by the vehicle frame. The springs are thus adapted to vibrate, oscillate, twist, or otherwise responsively react to the applied force for contributing to the dissipation of the same and thereby protect the spray boom assembly. In view of the resiliency of the springs shock-dampening expedients uniquely positioned are provided for coaction therewith.

Therefore, it is an object of the present invention to provide a spray boom assembly which may be carried upon any preselected transport vehicle such as a two wheel or four wheel drive truck of any predetermined design or upon a tractor or towed vehicle which assembly is suspended in its midsection by a plurality of flat springs.

It is another object of the present invention to provide a spray boom assembly structure of the type stated wherein a support frame is fixed to the vehicle and with a plurality of spring elements provided in the upper portion of such frame for interconnection with the upper portion of the boom assembly midsection for suspension of such structure.

It is a still further object of the present invention to provide a spray boom structure which is not directly secured to the vehicle frame and which is floatingly suspended in the midsection thereof and being adapted for rockable movement under receipt of unbalancing forces resulting from travel of the vehicle over irregular terrain.

It is another object of the present invention to provide a spray boom structure of the type stated which incorporates novel spring suspending components and coacting shock absorbers presented at a critical angle for cooperating with such springs.

Another object of the present invention is to provide a spray boom structure of the type stated having unique suspension means which is adaptable for utilization with a wide variety and selection of spray booms so that no alteration is requisite with respect to the construction of the boom frame components and plumbing carried thereby.

It is a still further object of the present invention to provide a spray boom structure of the type stated which is uniquely manufactured; which is readily securely mountable upon any preselected vehicle; which is reliable, being resistant to breakdown, as well as to assuring of effective protection against damage to the spray boom.

BRIEF DESCRIPTION OF THE DRAWINGS

FIG. 4 is a vertical transverse sectional view taken on the line 4—4 of FIG. 2.

FIG. 5 is a vertical transverse sectional view taken on line 5—5 of FIG. 4.

FIG. 6 is a horizontal transverse sectional view taken on line 6—6 of FIG. 5.

FIG. 7 is a vertical transverse sectional view taken on line 7—7 of FIG. 4.

FIG. 8 is a vertical transverse sectional view taken on line 8—8 of FIG. 7.

FIG. 9 is a vertical view taken on the line 9—9 of FIG. 2.

FIG. 10 is a schematic rear elevational view of the boom support structure illustrating same in rocked condition.

DESCRIPTION OF THE PREFERRED EMBODIMENT

Figure 1:
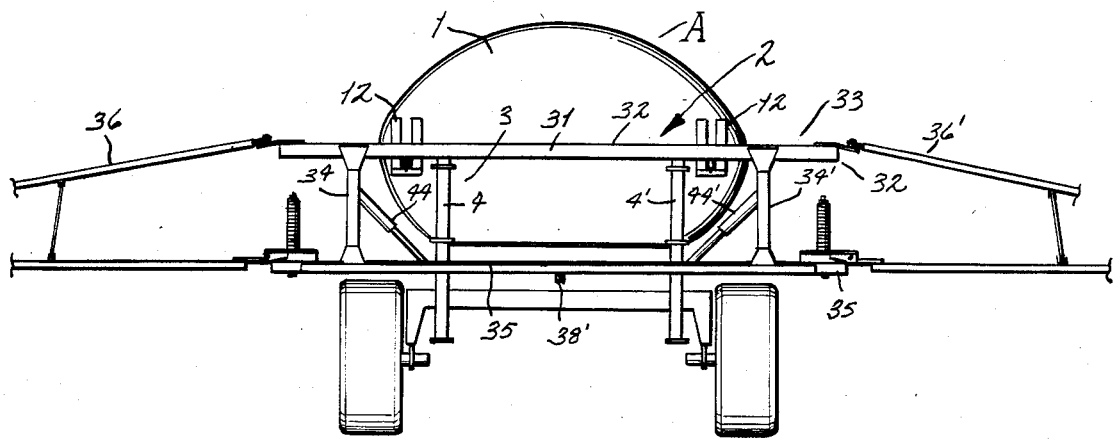
FIG. 1 is a rear elevational view of a vehicle provided with a spring mounted spray boom structure constructed in accordance with and embodying the present invention.
Figure 2:
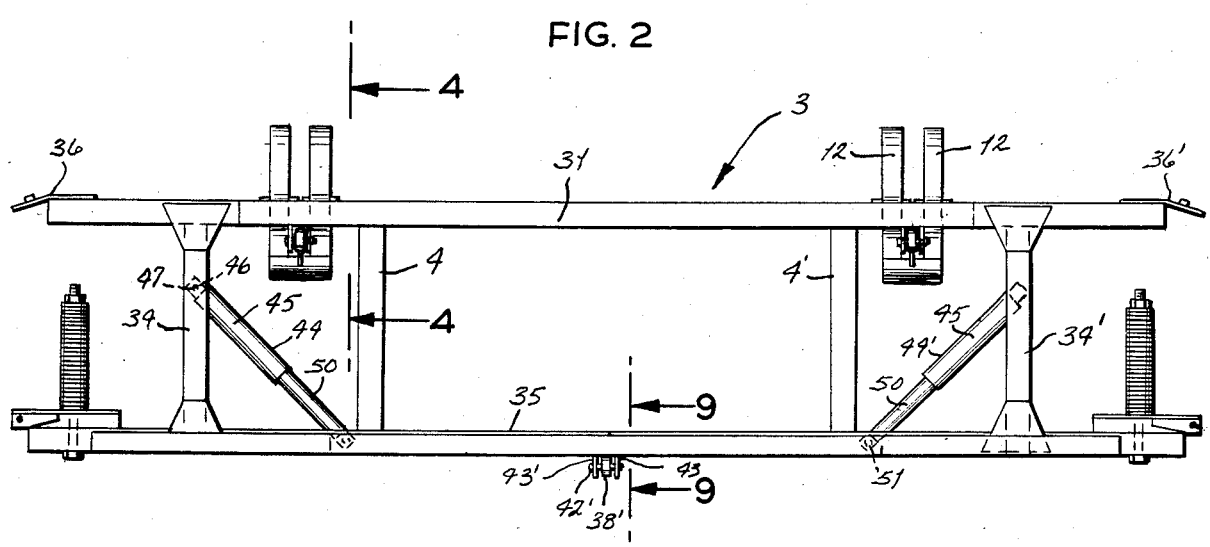
FIG. 2 is an enlarged, fragmentary rear elevational view taken at 2 in FIG. 1.

Referring now by reference characters to the drawings which illustrate the preferred embodiment of the present invention, A generally designates a vehicle, such as, for example, a truck of four-wheel drive type and having a main frame (not shown) for supporting the customary tank 1 constituting a reservoir for the particular agricultural treatment liquid to be spread by the spraying system of the present invention to be described hereinbelow. Fixed upon the rear portion of vehicle A is a suspension frame 3 comprised of a pair of horizontally spaced apart, parallel uprights 4, 4' rigid, as by welding, at the upper ends thereof to an upper transverse beam 5 which projects at the opposite ends thereof beyond uprights 4, 4'. The lower ends of uprights 4, 4' are fixed to a lower transverse beam 6 thereby completing the four sides of frame 3. Although the rigid attachment of frame 3 to the frame of vehicle A may be effected in any of numerous ways, within the knowledge of one having ordinary skill in the art, FIG. 6 illustrates one manner of securement. With reference thereto, it will be seen that uprights 4, 4' are each abuttingly maintained against standards 7, 7', respectively, carried upon the frame of vehicle A, as by bolts 8 (see FIG. 6) engaged through vertically spaced apart pairs of sandwiching plates 9, 9'. The components of frame 3 are desirably of square tubular stock providing maximum strength.

Provided on each projecting end portion of upper transverse beam 5 is a pair of mounting members 10 (see FIG. 4) in side by side relationship for engaging the rectilinear forward ends 11 of spring members 12. Each mounting member 10 is formed from narrow plate stock to provide a lower horizontal portion 13, a vertical portion 14 normal to said portion 13, and upper horizontal pair of tabs 15, 15' for embracing transverse beam 5 of frame 3 in snug abutment against the respective confronting portions thereof, namely, lower and upper sides 16, 17 and intervening forward vertical side 18. Extending upwardly between tabs 15, 15' continuous with side 18 is a finger-like projection 19 being apertured spacedly above beam 5 for accepting therethrough the forward end of a bolt 20 which in the rearward portion thereof extends through an aligned opening in the forward end of spring 12 for anchoring of same against rearward vertical side 18' of beam 5.

Each spring 12 is of like construction so that the description of one is applicable to all. Each end portion 11 progresses downwardly through an opening in the rearward extension 21 of lower portion 13 of mounting member 10 and immediately therebelow spring 12 is arcuated to develop a substantially loose, circular configuration, 22, formed upon radii for maintaining same encircling of, but spacedly from, said beam 5. At a point substantially aligned with extension 21, as at a, in the lower rearward quadrant of circular portion 22, spring 12 is reversely curved, as at b, and thence directed rectilinearly upwardly and rearwardly to present an elongate terminal or tail section 23 secured proximate the extremity thereof, as by a bolt 24, upon the forwardly and downwardly inclined leg 25 of a downwardly opening angulated plate 26 of spring support bracket B of a ball joint swivel assembly 27. The pair of springs 12 at each one end of beam 5 are engaged to the same plate 26 so that there is a ball joint swivel assembly 27 for each spring pair. Each assembly 27 comprises the customary upwardly projecting, weldedly secured support 27' for a customary swivel or ball 28 disposed within a fixed race 29 and engageable upon a clevis pin 30 secured in end portions within the aligned clevis from ears c, c' fixed to, and depending from, the upper cross bar 31 of the midsection 32 of a boom assembly broadly designated 33 (FIG. 1). Centrally secured upon angulated plate 26 intermediate the secured ends of the related springs 12 is a spring spacer s. From the foregoing it is to be noted that the forward, substantially circular portion 22 of each spring 12 is of adequate scope so as to permit twisting, contracting, and expanding movement responsive to forces acting thereupon for stabilizing the spray boom structure to be described. Each spring 12 is formed from a single length of flat steel spring stock and may be characterized as being of generally overall S-shape, and may be considered as structurally similar to standard or so-called Danish S-tines as are utilized upon cultivators with the rearward or tail-forming end joints being free for engaging the ground being traversed in order to loosen the soil. Thus, such tines would, in effect, be rotated through an angle of 90° from that of springs 12. With such tines the tail-forming ends are, of course, free and normally provided with sweeps.

Midsection 32 comprehends a pair of posts 34, 34' which are fixed at the upper and lower ends thereof to upper and lower, normally horizontal, parallel cross bars 31, 35, respectively, thereby developing a generally four-sided frame. Cross bars 31, 35 extend laterally outwardly beyond posts 34, 34' for engagement to the outer primary wing sections, indicated broadly, at 36, 36' of boom assembly 33 and which latter sectionsare suitably connected to secondary end wing sections (not shown). It is to be understood that the outer primary and secondary end wing sections do not form a part of the present invention; the same being of conventional construction incorporating the usual plumbing components; expedients providing swingable movement of the same between inoperative, folded, and operative, extended conditions; as well as with suitable components between the wing sections and midsection 32 to cushion shock and minimize impact transferred to the primary wings when the assembly 33 is in motion under rugged field conditions. Usually, such would comprehend shock absorbers or spring configuration of some type, popularly of coil character.

Suspension frame 3 and boom assembly midsection 32 are interconnected in their lower central portions by means of a midsection stabilizing bar 37 axially perpendicular to the planes of said frame 3 and midsection 32, and carrying at the forward and rearward ends ball joint swivels 38, 38', respectively, integrally formed upon a threaded stem 39, 39', respectively engageable within a tapped bore 40, 40' in said bar 37. Said swivel joints 38, 38' are of like character as swivel joint assemblies above described, and are mounted upon pins 42, 42', respectively, engaged within aligned clevis type ears 43, 43', rigid with, and depending from, lower cross bar 35 and lower beam 6, centrally thereof. It will thus be seen that stabilizing bar 37 together with ball joint swivels 38, 38' serves a dual function: one is to assure of a constant distance between suspension frame 3 and boom assembly midsection 32 with such distance being adjustable by the threaded character of swivel stems 39, 39' whereby lengthwise adjustment may be effected to maintain boom assembly 32 vertical; and the other function is to provide a pivot point in the middle of the midsection 32 for said ball joint swivels, 38, 38' allowing motion of the same within the limits of movement of said swivels but which in operation will be substantially within the vertical plane of midsection 32.

Figure 3:
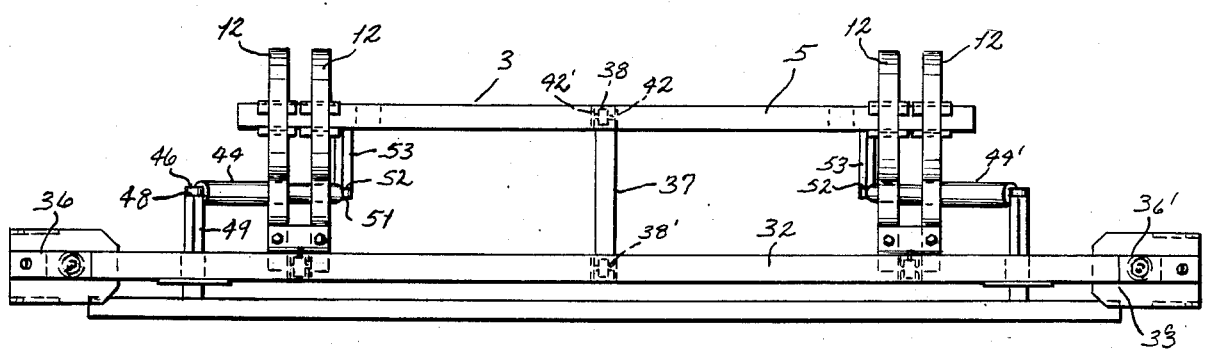
FIG. 3 is a top plan view taken at 3 in FIG. 2.

Also interposed between suspension frame 3 and boom assembly midsection 32 is a pair of fluid shock absorbers 44, 44'. The upper or cylinder portions 45 of each shock absorber 44, 44' is provided with an eyelet 46 for projection thereto of a shaft-forming pin 47 received at the rearward end thereof within a socket (not shown) provided in,and opening through, the forward end face 48 of, an arm 49 fixed upon,and extending forwardly from, each post 34, 34', in transversely aligned relationship with, boom midsection 32. The lower or piston portion 50 of each shock absorber 44,44', at the extremity thereof, is similarly provided with an eyelet 51 for projection therethrough of a shaft-forming pin (not shown) received at the rearward end thereof within a socket (not shown) provided in, and opening through, the rearward end face 52 of an arm 53 fixed upon suspension frame 3 in opposite lower end portions thereof and projecting rearwardly therefrom in axially parallel relation to the related arm 49. With reference being made to FIG. 3, it will be seen that arms 53 are displaced inwardly, and located downwardly, of the related arm 49. By reason of this relationship between the pairs of cooperating arms 53, 49 and the normally intervening vertical distance between the same, said shock absorbers 44,44' are presented in such manner as to incline at an angle within the range of approximately 40° to approximately 50° to the horizontal. However, the preferred angle would be approximately 45° for purposes presently appearing. It will be seen that the paired arms 53,49 are of such length so as to present the associated shock absorber 44,44' normally within a vertical plane parallel to the planes of suspension frame 3 and boom assembly midsection 32, and substantially intermediate, the same.

The novel spring mounted spray boom structure of the present invention is manifestly designed to assure appropriate means for applying the treatment liquids, such as fertilizers and the like, to the ground. It has long been recognized that the even distribution of such chemicals depends upon the capacity of the spray boom structure to resist the inordinate reactions to shocks caused by unevenness in the ground being traversed as a result of ruts, gulleys, waterways, and the like. By reason of the present invention, liquid chemicals may now be dispensed in a constant, even manner. The suspension of the five-section spray boom assembly 32 by the generally S-shaped springs 12 provides a unique floating character to said assembly 32, independently of the vehicle. This spring suspension serves to support, balance, and cushion the entire weight of the five-component boom assembly 32. Thus, the only area of support to the boom is the two pairs of S-shaped springs 12, each of which is free to independently twist and absorb vertical and/or horizontal directed forces of shock.

It will be thus understood that with the vehicle hitting a field rut or other unforeseen obstacle, the particular axle will drop into such rut creating a severe jolt which is immediately transferred through the vehicle frame to the attached suspension frame 3. The springs 12 absorb the initial jolt which is dampened by shock absorbers 44, 44'. Thus, as one end of the boom assembly 33 dips toward the ground the proximate shock absorber 44, 44' as the case may be, contracts while the opposite shock absorber will expand (see FIG. 10). At such juncture the system is functioning in an off balance manner, stabilized only by the pivot provided by ball joint swivel 38' hence the assembly is caused to respond to reverse the process and balance the boom assembly 33. Such action can only be achieved through the aid of the floating character provided boom assembly 33 and, hence, midsection 32 by reason of the unique spring suspension.

Absorbers 44, 44' provide a crucial dampening effect. Without such, the boom midsection 32 together with the associated components of assembly 33 would, if supported only by springs 12, continually bounce up and down as the vehicle moves through the field being treated. Thus, shock absorbers 44, 44' serve to dampen the vertical and/or horizontal shock absorbed by springs 12. If said shock absorbers 44, 44' were beyond the aforesaid attitude of approximately 40° to approximately 50° to the horizontal, the same would be inadequate to effectively dampen the vibrational movement of springs 12 reactive to the forces imparted thereto resulting from vehicle subjection to uneven ground conditions.

Thus, the present invention in contrast to the prior art provides a novel floating suspension for the spray boom assembly which sensitively responds to the impact of shocks transmitted through the vehicle frame so as to fully support the spray boom assembly as well as to cushion it against reactive movement adversely effecting even distribution of treatment liquids. As pointed out above, springs 12 provide a mounting which conduces to a balanced attitude of assembly 33 and with suitable assistance being provided by shock absorbers 44,44'. By reason of the relationship of the structural components interengaging suspension system 3 and spray boom assembly 32 the latter will be constrained to rock primarily within a vertical plane whereby ball joint swivel 38 serves as the pivot point and with shock absorbers 44,44' efficaciously and speedily restoring said assembly 32 to normal, operating condition.

In the drawings for purposes of illustration only the shock absorbers 44,44' are shown in an attitude such that they progress downwardly and inwardly with relation to the spray boom assembly. However, it is to be understood that the same may, without any loss of effectiveness, be presented so that they extend downwardly and outwardly but within the critical range of angularity. Understandably, if said shock absorbers 44,44' are presented to extend downwardly and outwardly then they would be necessarily located in the respective side portions of the structure developed by midsection 32 and frame 3 so as to be disposed for appropriate coaction with the associated spring members 12.

What is claimed is:

1. A spray boom structure mountable upon a vehicle for movement therewith comprising a rigid support frame fixed upon the rearward portion of said vehicle, a spray boom assembly presented spacedly rearwardly of said support frame and having a midsection, a plurality of flat spring members each having forward and rearward end portions, said springs being respectively secured at the forward ends thereof upon said support frame, said springs being respectively secured at the rearward ends thereof to said midsection, each spring member being configured to form a substantially annular forward portion for encircling relationship with respect to said support frame and a tail-like portion extending rearwardly between said support frame and midsection to provide said rearward end portion whereby said springs provide a spring suspension for said spray boom assembly.

2. The structure defined in claim 1 wherein said support frame and said midsection each include upper and lower end portions and lateral outer end portions, said spring members at the forward ends thereof being secured upon the upper end portions of said support frame, and said spring members being secured at the rearward ends thereof to the upper portion of said midsection.

3. The structure defined in claim 2 wherein said flat spring members are disposed in first and second pairs, said pairs being secured to the upper end portion of said support frame in spaced apart relationship each being proximate an outer end portion of said frame.

4. The structure as defined in claim 2 wherein said terminal or tail portion extends downwardly below the upper end portion of said support frame and thence extends upwardly toward the upper end portion of said midsection.

5. The structure defined in claim 4 wherein each spring is configured to form generally an S-shaped transmission between said annular forward portion and said tail-like portion.

6. A spray boom structure mountable upon a vehicle for movement therewith comprising a rigid support frame fixed upon the rearward portion of said vehicle, a spray boom assembly presented spacedly rearwardly of said support frame and having a midsection, a plurality of flat spring members having forward and rearward end portions, said springs being secured at the forward ends thereof upon said support frame, said springs being secured at the rearward ends thereof to said midsection whereby said springs provide a spring suspension for said spray boom assembly, and further comprising a plurality of fluid shock absorbers having upper and lower ends located between said support frame and said midsection, there being first and second mounting arms for each shock absorber, said first arms being secured to and extending rearwardly from the upper end portion of the support frame, said first arms being secured in their projecting ends portions to the upper end of the related fluid cylinder, said second arms being secured to, and projecting forwardly from, said midsection, said second arms being secured in their projecting portions to the lower end of the related shock absorber, said first and second arms being axially parallel.

7. The structure of claim 6 wherein the related first and second arms are mutually offset to present the associated shock absorber so that the axis thereof is disposed at an angle to the vertical within the range of approximately 40° to approximately 50°.

8. The stucture of claim 6 wherein said first arms are disposed laterally inwardly of the related second arms, with the intervening distance being such as to cause the associated fluid shock absorber to be presented so that the longitudinal axis thereof is disposed at an angle to the vertical of approximately 45°.

9. A spray boom structure mountable upon a vehicle for movement therewith comprising a rigid support frame shaft upon the rearward support of said vehicle, a spray boom assembly presented spacedly rearwardly of the support frame and having a midsection, said support frame being of general rectangular configuration, having upper and lower parallel beams interconnected by vertically extending spaced apart uprights, said spray boom assembly midsection being of generally rectangular configuration having upper and lower cross bars interconnected by horizontally spaced apart posts, a pair of flat spring members in side by side relationship extending between each end portion of said upper beam of said suport frame and the aligned portion of the upper cross bar of said midsection, to provide a spring suspension for said spray boom assembly, each spring member having forward and rearward end portions and being configured in the forward end portion thereof to provide a substantially annular portion disposed encirclingly of the proximate portion of said upper transverse beam of said support frame, the rearward end portion of each spring member being configured to form a tail-like portion extending between said support frame and said midsection, a swivel joint assembly depending from the upper cross bar of the midsection in confronting relationship with the proximate pair of spring members, and means engaging the extremities of the tail-like portions of said springs to the related swivel joint assembly.

10. The assembly of claim 9 wherein the shock absorbing means comprise a pair of fluid cylinders, means supporting said cylinders intermediate said support frame and said midsection for disposition proximate, but laterally outwardly of, each pair of springs, each of said fluid cylinders being disposed so that the longitudinal axis thereof forms an angle of approximately 45° to the vertical.

11. A spray boom structure mountable upon a vehicle for movement therewith comprising a rigid support frame fixed upon the rearward portion of said vehicle, a spray boom assembly presented spacedly rearwardly of said support frame and having a midsection, a plurality of flat spring members each being configured to provide a substantially annular forward end portion in encircling relationship with the proximate upper end portion of said support frame, said forward end portion being secured at the extremity thereof to said support frame, each spring member having a rearward end portion of tail-like configuration, and means connecting said rearward end portion at the extremity thereof to said midsection, whereby said springs provide a spring suspension for said spray boom assembly, said connecting means comprising a swivel joint assembly having a lower base plate and a suspension connected to the proximate portion of the midsection for engaging the swivel joint to allow rockable movement thereof, the related spring members being engaged to the lower base plate of the related swivel joint assembly.

* * * * *